US006379783B1

(12) United States Patent
Kim et al.

(10) Patent No.: US 6,379,783 B1
(45) Date of Patent: Apr. 30, 2002

(54) PROTECTION LAYER OF PLASMA DISPLAY PANEL AND METHOD OF FORMING THE SAME

(75) Inventors: Jin Young Kim, Kyungsangbuk-do (KR); Sen Gouk Kim, Oreol (RU); Myung Ho Park; Jae Hwa Ryu, both of Kyungsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/442,747

(22) Filed: Nov. 18, 1999

Related U.S. Application Data

(62) Division of application No. 08/950,975, filed on Oct. 15, 1997, now Pat. No. 6,013,309.

(30) Foreign Application Priority Data

Feb. 13, 1997 (KR) .......................................... 97-4268
Mar. 18, 1997 (KR) .......................................... 97-9078

(51) Int. Cl.[7] .......................................... B32B 9/00
(52) U.S. Cl. .................... 428/210; 428/195; 428/325; 428/701; 313/529
(58) Field of Search .................... 428/323, 210, 428/195, 701, 325; 313/529

(56) References Cited

U.S. PATENT DOCUMENTS 3,849,190 A * 11/1974 Foster et al. .................. 17/219
4,083,614 A * 4/1978 Aboelfotoh et al. .......... 316/19
4,163,728 A * 8/1979 Cheng et al. ................. 252/18
4,179,383 A * 12/1979 Cheng et al. ................. 252/25
4,226,739 A * 10/1980 Cheng et al. ............... 252/389
4,293,429 A * 10/1981 Cheng et al. ................. 252/18
4,849,674 A * 7/1989 Cherry et al. ............... 313/509
5,426,078 A * 6/1995 Heindl ........................ 501/94
5,770,921 A 6/1998 Aoki et al. ................. 313/581
5,905,336 A * 5/1999 Van Hal et al. ............ 313/497

FOREIGN PATENT DOCUMENTS

EP 0554172 A1 1/1993
JP 7-230766 * 8/1995
JP 10158826 * 6/1998

OTHER PUBLICATIONS

K. Amano et al. "21.3: Characteristics of Thick–Film –Printed MgO for a Practical Use in ac Plasma Displays" SID 94 Digest, pp. 323–326, No Date.

* cited by examiner

*Primary Examiner*—Archene Turner
(74) *Attorney, Agent, or Firm*—Fleshner & Kim, LLP

(57) ABSTRACT

A method of forming a protection layer of a plasma display panel, which has upper electrodes, lower electrodes and a barrier rib, includes the steps of: forming a dielectric layer on the upper electrodes; and forming a MgO protection layer on the dielectric layer by the method of direct coating the MgO solution on the surface of the dielectric layer. Some advantages are derived by properly mixing MgO particles, salt containing Mg, and organic binder and coating an MgO protection layer (thin film) on the surface of the PDP substrate irrespective of coating methods by simple facility and processing. These advantages include PDP MgO protection layer formation to reduce PDP production cost, time and firing voltages, and adjustment of the protection layer's thickness.

25 Claims, 2 Drawing Sheets

PROTECTION LAYER OF PLASMA DISPLAY PANEL AND METHOD OF FORMING THE SAME

This application is a Divisional of application Ser. No. 08/950,975 filed Oct. 15, 1997 now U.S. Pat. No. 6,013,309.

BACKGROUND OF THE INVENTION

1. Field of the Invention

The present invention relates to a protection layer of a PDP (Plasma Display Panel) and a method of forming the same and, more particularly, to a protection layer of a PDP and a method of forming the same by which an excellent protection layer can be formed on the surface of the PDP's substrate.

2. Background of the Related Art

FIG. 1 is a cross section of a general PDP. As shown in FIG. 1, the PDP comprises: an upper structure having a pair of upper electrodes 4 formed on the same surface of a front glass substrate 1, a dielectric layer 2 formed on the upper electrodes 4 by printing method, and a thin film 3 (hereinafter, referred to as protection layer) deposited on the dielectric layer 2; a lower structure having lower electrodes 12 formed on a back glass substrate 11, a barrier rib 6 formed to prevent a mis-discharge in the cell adjacent to the lower electrodes, and phosphor 8, 9 and 10 formed around the barrier rib 6 and the lower electrodes 12; and a discharging region 5 formed in a space between the upper and lower structures by injecting an inert gas therein.

The lower electrodes 12 are termed "data electrodes" into which image data is transferred. The upper electrodes 4 are termed "display electrodes" comprising a scan electrode for discharging the image data fed into the cell, and a sustain electrode to maintain the cell's discharging.

The PDPs as constructed above are widely used as a flat display device because they can display signals at high speed and be manufactured in a large size.

Referring to FIG. 1, when an image data is transferred into the lower electrodes 12 and a discharging signal is fed into the scan electrode of the upper electrodes, a driving voltage is applied to the discharging space between the upper and lower electrodes, creating a surface discharge in the discharging region 5 on the surfaces of the dielectric and protection layers 2 and 3. Such a surface discharge causes ultraviolet radiation while the signal is entered.

Because the ultraviolet radiation does not last long enough to display signals, the discharging and sustain signals respectively applied by the scan and sustain electrodes of the upper electrodes 4 provide extra discharging time for a display while no image data is entered through the lower electrodes 12.

The ultraviolet ray 7 excites the phosphor 8, 9 and 10 to display color signals.

Electrons in the discharging cell are accelerated towards the negative (−) electrode by a driving voltage applied, colliding with a penning mixture gas consisting of mainly inert gases, i.e., He and additional Xe, Ne, or other gases. Thus excited inert gas generates the ultraviolet ray 7 having the wavelength of 147 nm. The ultraviolet ray 7 collides with the phosphor 8, 9 and 10 that surround the lower electrodes 12 and the barrier rib 6, to generate a light in the ultraviolet spectrum region.

PDPs must have the protection layer 3 on the whole surface of the dielectric layer to protect the dielectric layer 2 against sputtering effect caused by a secondary emission during a discharge, the protection layer 3 usually being a transparent layer consisting of magnesium oxide (hereinafter, referred to as MgO). The protection layer 3 protects the dielectric layer 2 of the cells to extend the life of the panel and reduce the driving voltages.

A conventional method of forming the protection layer 3 is disclosed in SID 94 DIGEST (P 323–326, by Amano), by which a MgO paste is prepared from MgO powder mixture in a solvent, screen printed to form an MgO protection layer 2 μm thick and heated at 500° C.

Such a screen printing can be performed at low costs for materials and available as an alternative new technique. It is applicable to MgO deposition on a glass substrate of an AC PDP but not appropriate in a difficult deposition of a MgO thick layer due to the PDP's characteristics.

As disclosed in European Patent Application No. 93400201.5 (Publication No. EP0554172A1), a MgO protection layer of several hundreds of nanometers in thickness might be coated by a vacuum method. The vacuum method is an E-beam and RF (Radio Frequency) sputtering that is expensive and inefficient in productivity due to its complex process such as vacuum and heat treatment. In addition, there are other limitations associated with the vacuum method, including firing voltage reduction and prevention of ion collisions to increase the device's life during a sputtering.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a protection layer of a PDP and a method of forming the same that substantially obviates one or more of the problems due to limitations and disadvantages of the related art.

An object of the present invention is to provide a protection layer of a PDP and its formation by which a protection layer can be coated with more ease by preparing a MgO solution (a solution containing Mg) for MgO protection layer formation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of forming a protection layer of a plasma display panel, which has upper electrodes, lower electrodes and a barrier rib, includes the steps of: forming a dielectric layer on the upper electrodes; and forming a MgO protection layer on the dielectric layer by the method of direct coating the MgO solution on the surface of the dielectric layer.

A method of forming such as printing, spraying, dipping and spin coating or the like a plasma display panel protection layer, which is to form a MgO protection layer on the surface of a substrate of a plasma display panel, includes the steps of: preparing a MgO solution which is a mixture of MgO particles, salt containing Mg, and organic solvents; coating the MgO solution on the surface of the substrate; and performing a firing of the coated substrate.

In a MgO solution for forming a MgO thin film on a substrate for a plasma display panel, a MgO protection layer for the plasma display panel consists of MgO particles, salt containing Mg, and organic solvents.

It is to be understood that both the foregoing general description and the following detailed description are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
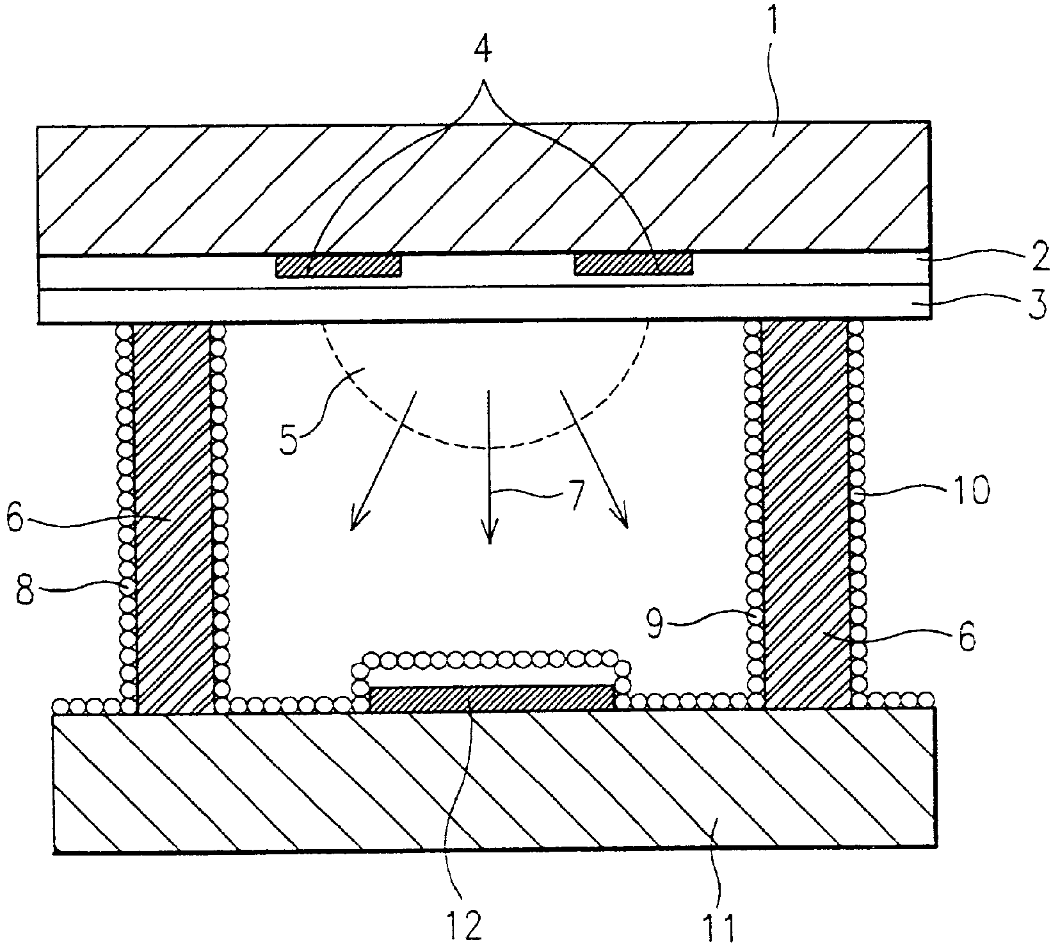
FIG. 1 Conventional Art
FIG. 1 is a cross section of a general PDP.

Reference will now be made in detail to the preferred embodiments of the present invention, examples of which are illustrated in the accompanying drawings.

According to the present invention, a protection layer 3 is made from a MgO solution for MgO protection layer formation which consists of transparent MgO particle, salt containing Mg and organic solvent.

First, a pair of upper electrodes 4, which are termed scan and sustain electrodes, are formed on an upper insulating substrate 1. The upper electrodes 4 typically use a transparent ITO (Indium Tin Oxide) electrode consisting of either indium oxide or tin oxide layer deposited.

To limit the upper electrodes 4's current that might occur in a complete cell during a discharge, a dielectric layer is formed by printing a dielectric material paste containing mainly lead oxide. Drying and firing follows the dielectric layer formation.

A protection layer 3 is then formed by using a MgO solution in order to prevent the dielectric layer from being damaged by a sputtering during a discharge of the upper electrodes 4.

To prepare a MgO solution, a certain Mg compound is first mixed with neutral materials such as alcohol, acetic acid ($CH_3COOH$), ethyl alcohol ($C_2H_5OH$) or the like to produce a diluted solution. Particles contained in the solution are dissolved by action of ultrasonic wave, the diluted solution being mixed with nitric acid. Note that the particles in the solution should not completely dissolved and particle size is preferably in the range between 0.01 $\mu$m and 0.5 $\mu$m.

The MgO solution consists of Mg compound of 1% to 10% by weight, acetic acid of 1% to 10% by weight, ethyl alcohol of 80% to 95% by weight, and nitric acid of 1% to 10% by weight. Thus prepared MgO solution is coated by general coating methods such as spin coating, printing, spraying or the like.

Lower electrodes are formed on a lower insulating substrate, and an insulating paste is coated by using a printing method to form barrier rib forming a discharging cell.

Phosphor are arranged in the discharging region in the cell. The upper and lower insulating substrates are combined by using a frit glass, followed by introducing discharging gas therein and completely sealing.

The following description relates to a material mixing process for MgO solution in accordance with the present invention.

The MgO solution formation contains MgO particles in the proportion of 0.01% to 0.2% by weight, preferably, 0.03% to 0.15% by weight, most preferably, 0.04% to 0.01% by weight. The MgO particle size is between 0.1 $\mu$m and 0.5 $\mu$m, most preferably, between 0.2 $\mu$m and 0.4 $\mu$m.

Salt containing Mg consists of $Mg(NO_3)$, $MgCl_2$, and $Mg(CH_3COO)_2$ in the proportion of 0.35% to 7.0% by weight, preferably, 1.5% to 5.0% by weight, most preferably, 2.0% to 4.0% by weight.

The other components are organic solvents such as ethanol, acetone, or methyl-ethyl ketone.

The MgO solution is then coated on the surface of the dielectric by an appropriate technique for the use purpose; for example, coating the solution by fixing a certain gap between the dielectric and squeeze. The squeeze should have a uniform surface, used in various forms such as tube, core, or rod type. The squeeze is made of glass or metals such as titanium that do not react with the MgO solution.

Other formation techniques include spray, dipping, and spin coating techniques.

Following the MgO solution coating organic solvents are vaporized for 5 minutes to leave salts containing initial MgO particles.

Thus coated substrate is then fired at temperature above 400° C., preferably, above 420° C., most preferably, above 450° C. Firing is carried out at the maximum temperature for 5 to 20 minutes, preferably, 10 to 15 minutes. The firing temperature is gradually increased up to the above temperatures for 40 to 120 minutes, preferably, 60 to 90 minutes.

Cooling time after the firing is approximately 40 to 120 minutes, preferably, 60 to 120 minutes.

According to the present invention, unwanted materials are vaporized from the salt by the above-mentioned process.

After firing, MgO particles are created from the salt and adhere to the existing MgO particles that function as a seed to start the growth of MgO.

FIRST EMBODIMENT 1

Figure 2:
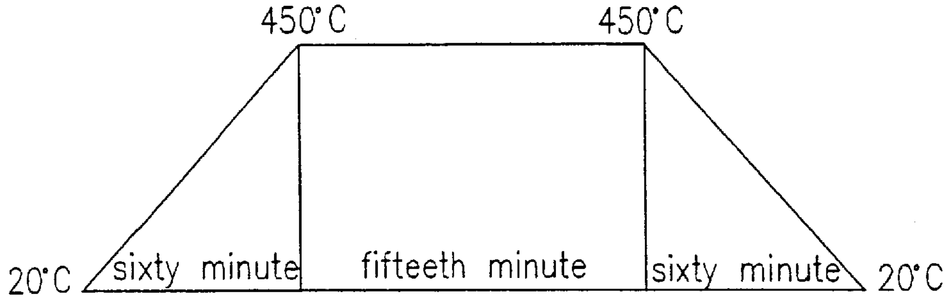
FIG. 2 is a graph showing temperature conditions of heat treatment in accordance with the present invention.

After a MgO solution 100 g is prepared by the composition as shown in Table 1 and coated on the substrate, the substrate is placed in a belt furnace and heat-treated in a manner as illustrated in FIG. 2.

| MgO SOLUTION COMPONENTS | wt. % |
|---|---|
| MgO PARTICLE | 0.08 |
| $Mg(NO_3)_2$ | 0.9 |
| $MgCl_2$ | 0.2 |

-continued

| MgO SOLUTION COMPONENTS | wt. % |
|---|---|
| $Mg(CH_3COO)_2$ | 3.3 |
| $C_2H_5OH$ | 95.52 |
| TOTAL | 100 wt % |

SECOND EMBODIMENT

The MgO solution 100 g prepared by the composition as shown in Table 2 is treated in the same manner as in the first embodiment.

| MgO SOLUTION COMPONENTS | wt. % |
|---|---|
| MgO PARTICLE | 0.12 |
| $Mg(NO_3)_2$ | 0.85 |
| $MgCl_2$ | 0.15 |
| $Mg(CH_3COO)_2$ | 3.4 |
| $C_2H_5OH$ | 80.48 |
| $CH_3COC_2H_5$ | 15.0 |
| TOTAL | 100 wt % |

Figure 3:
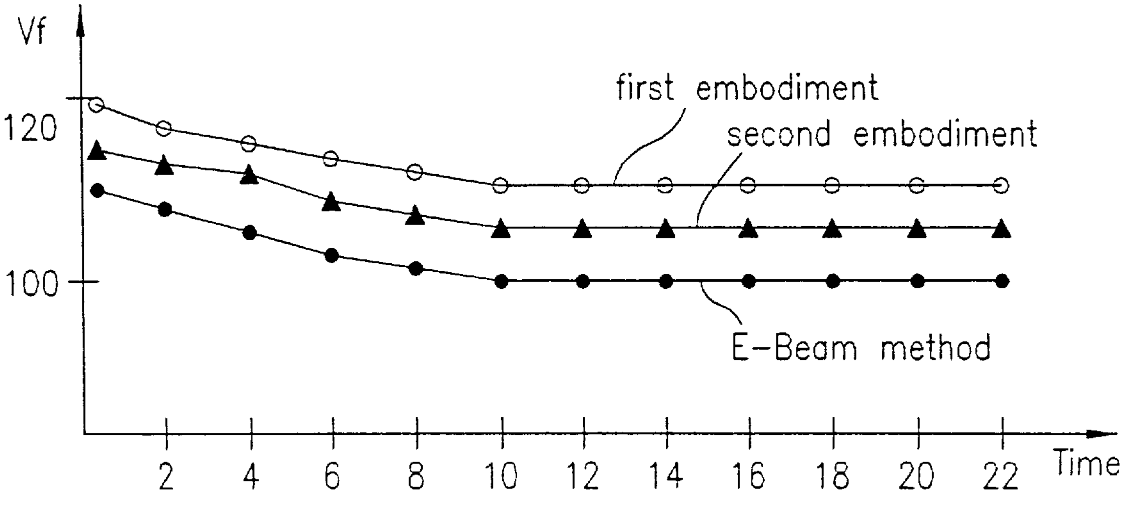
FIG. 3 is a graph of electrical characteristics of the present invention.

A MgO thick layer completed through the first and second embodiments is used to produce an AC PDP cell as shown in FIG. 1. Measurements of the firing voltage result in FIG. 3. As seen in FIG. 3, the AC PDP cell of the present invention has more excellent electrical characteristic than that manufactured by E-beam method. Because the difference in the electrical characteristic between the AC PDP cells produced by the present invention and E-beam method is insignificant, the AC PDP can be formed by either method.

As described above, some advantages are derived by properly mixing MgO particles, salt containing Mg, and organic solvent and coating an MgO protection layer (thin film) on the surface of the PDP substrate irrespective of coating methods by simple facility and processing. These advantages include PDP MgO protection layer formation to reduce PDP production cost, time and firing voltages, and adjustment of the protection layer's thickness.

It will be apparent to those skilled in the art that various modifications and variations can be made in the protection layer of a PDP and a method of forming the same according to the present invention without departing from the spirit or scope of the invention. Thus, it is intended that the present invention cover the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An MgO protection layer forming precursor material for forming an MgO protection layer on a substrate for a plasma display panel, comprising:

MgO particles, salt containing Mg, and at least one organic binder, wherein the MgO particles comprise between 0.01% and 0.2% by weight of the material.

2. The MgO protection layer forming precursor material as defined in claim 1, wherein the MgO particle size is between 0.1 $\mu$m and 0.5 $\mu$m.

3. The MgO protection layer forming precursor material as defined in claim 1, wherein the salt containing Mg is $Mg(NO_3)_2$, $MgCl_2$, or $Mg(CH_3COO)_2$.

4. The MgO protection layer forming precursor material as defined in claim 1, wherein the organic binders are at least two materials selected from the group consisting of ethanol, acetone, or methyl-ethyl ketone.

5. The MgO protection layer forming precursor material as defined in claim 1, wherein the paste of 100% by weight comprises MgO particles of 0.01% to 0.2% by weight, the salt containing Mg of 0.35% to 7.0% by weight, and the organic binder for the balance.

6. The MgO protection layer forming precursor material as defined in claim 1, wherein the material comprises between 0.03% and 0.15% by weight of MgO particles.

7. The MgO protection layer forming precursor material as defined in claim 1, wherein the material comprises between 0.04% and 0.1% by weight of MgO particles.

8. A plasma display panel having an MgO protection layer formed on a surface of a substrate, the MgO protection layer being formed from an MgO protection layer forming precursor material, the protection layer forming precursor material comprising MgO particles, salt containing Mg, and at least one organic binder, wherein the MgO particles comprise between 0.01% and 0.2% by weight of the material.

9. The plasma display panel as defined in claim 8, wherein the salt containing Mg is $Mg(NO_3)_2$, $MgCl_2$, or $Mg(CH_3COO)_2$.

10. The plasma display panel as defined in claim 8, wherein the paste of 100% by weight comprises MgO particles of 0.01% to 0.2% by weight, the salt containing Mg of 0.35% to 7.0% by weight, and the organic binder for the balance.

11. The plasma display panel as defined in claim 7, further comprising:

a dielectric layer, wherein the MgO protection layer is formed thereon.

12. The plasma display panel as defined in claim 11, further comprising:

an upper insulating substrate;

a pair of upper electrodes, which are formed on the upper insulating substrate, wherein the MgO protection layer is between the dielectric layer and the pair of upper electrodes.

13. The plasma display panel as defined in claim 12, wherein the upper electrodes comprise an indium oxide or a tin oxide layer, wherein the MgO protection layer prevents damage to the dielectric layer that may be caused by the upper electrodes.

14. The plasma display panel as defined in claim 12, wherein the dielectric layer comprises a dielectric material paste comprising lead oxide and wherein the MgO protection layer prevents damage to the dielectric layer that may be caused by the upper electrodes.

15. The plasma display panel as defined in claim 12, wherein the material comprises between 2% and 4% by weight of salt containing magnesium.

16. The plasma display panel as defined in claim 8, wherein the material comprises between 0.03% and 0.15% by weight of MgO particles.

17. The plasma display panel as defined in claim 8, wherein the material comprises between 0.04% and 0.1% by weight of MgO particles.

18. The plasma display panel as defined in claim 8, wherein the material comprises:

0.08 wt % MgO;

0.9 wt % $Mg(NO_3)_2$;

0.2 wt % $MgCl_2$;

3.3 wt % $Mg(CH_3COO)$; and 95.52 wt % $C_2H_5OH$.

19. The plasma display panel as defined in claim 8, wherein the material comprises:

0.12 wt % MgO;

0.85 wt % $Mg(NO_3)_2$;

0.15 wt % $MgCl_2$;

3.4 wt % $Mg(CH_3COO)$;

80.48 wt % $C_2H_5OH$; and 15 wt % $CH_3COC_2H_5$.

20. A plasma display panel having an MgO layer-forming precursor material disposed on a surface thereof, the MgO layer forming precursor material comprising MgO particles, a salt containing magnesium, and at least one organic binder, wherein the salt containing magnesium comprises 0.035% to 7% by weight of the material.

21. The plasma display panel as defined in claim 10, wherein the salt containing Mg is $Mg(NO_3)_2$, $MgCl_2$, or $Mg(CH_3COO)_2$.

22. The plasma display panel as defined in claim 20, wherein the material comprises between 1.5% and 5% by weight of the salt containing magnesium.

23. An MgO protection layer forming precursor material for forming an MgO protection layer on a substrate for a plasma display panel, comprising:

MgO particles;

between 0.035% to 7% by weight of a salt containing magnesium; and at least one organic binder.

24. The plasma display panel as defined in claim 23, wherein the material comprises between 1.5% to 5% by weight of salt containing magnesium.

25. The plasma display panel as defined in claim 23, wherein the material comprises between 2% to 4% by weight of salt containing magnesium.

* * * * *